(12) United States Patent
Ayala

(10) Patent No.: US 6,517,005 B1
(45) Date of Patent: Feb. 11, 2003

(54) METHOD FOR MAKING CONTACTLESS CARDS WITH COILED ANTENNA

(75) Inventor: Stéphane Ayala, Marseille (FR)

(73) Assignee: Gemplus (FR)

( * ) Notice: Subject to any disclaimer, the term of this patent is extended or adjusted under 35 U.S.C. 154(b) by 0 days.

(21) Appl. No.: 09/379,298

(22) Filed: Aug. 23, 1999

Related U.S. Application Data

(63) Continuation of application No. PCT/FR98/00316, filed on Feb. 18, 1998.

(30) Foreign Application Priority Data

Feb. 24, 1997 (FR) .............................. 97 02145

(51) Int. Cl.[7] .............................................. G06K 19/06
(52) U.S. Cl. ......................... 235/492; 235/441; 235/478
(58) Field of Search .................. 235/492, 441, 235/478

(56) References Cited

U.S. PATENT DOCUMENTS

| | | | | |
|---|---|---|---|---|
| 4,417,413 A | * | 11/1983 | Hoppe et al. ................ | 235/441 |
| 5,448,110 A | * | 9/1995 | Tuttle et al. ................. | 257/723 |
| 5,588,885 A | * | 12/1996 | Collins et al. .............. | 439/204 |
| 5,612,532 A | * | 3/1997 | Iwasaki ....................... | 235/486 |
| 5,614,297 A | * | 3/1997 | Velazquez ................... | 428/212 |
| 5,670,015 A | * | 9/1997 | Finestone et al. ........... | 156/324 |
| 5,703,755 A | * | 12/1997 | Flesher et al. .............. | 174/254 |
| 5,817,207 A | * | 10/1998 | Leighton .................... | 156/298 |
| 5,852,289 A | * | 12/1998 | Masahiko .................... | 235/492 |
| 5,962,099 A | * | 10/1999 | Bloch et al. ................ | 428/214 |
| 6,036,099 A | * | 3/2000 | Leighton .................... | 156/154 |
| 6,045,043 A | * | 4/2000 | Bashan et al. .............. | 235/441 |
| 6,095,423 A | * | 8/2000 | Houdeau et al. ............ | 235/478 |
| 6,095,424 A | * | 8/2000 | Prancz ........................ | 235/492 |
| 6,214,155 B1 | * | 4/2001 | Leighton .................... | 156/298 |

FOREIGN PATENT DOCUMENTS

| | | |
|---|---|---|
| DE | 4437721 | 4/1996 |
| EP | 0570784 | 11/1993 |
| FR | 000709804 A1 * | 5/1996 |
| JP | 410193850 * | 7/1998 |
| WO | WO96/17321 | 6/1996 |

* cited by examiner

Primary Examiner—Karl D. Frech
Assistant Examiner—Allyson Sanders
(74) Attorney, Agent, or Firm—Burns, Doane, Swecker & Mathis, L.L.P.

(57) ABSTRACT

The invention concerns the production of contactless transmission chip card, and particularly mixed cards operating with or without contact. The method for the reliable and efficient setting of an integrated circuit module (M) and of an inductive transmission antenna (A), consists in producing the module providing connection ranges for the antenna, making an antenna with a flat coiled wire, and soldering the ends of said antenna on the module ranges, then making a plastic wafer (30) provided with an opening, the bottom of this opening being closed by an adhesive film (34). The module and the antenna are set against the wafer, and maintained by the adhesive material at the bottom of the housing. Another wafer (40) is directly mounted on the assembly.

13 Claims, 2 Drawing Sheets

FRONT VIEW

REAR VIEW

CROSS-SECTIONAL VIEW

METHOD FOR MAKING CONTACTLESS CARDS WITH COILED ANTENNA

CROSS REFERENCES TO RELATED APPLICATIONS this is a continuation of application No. PCT/FR98/00316, filed Feb. 13, 1998.

BACKGROUND

1. Field of the Invention

The invention concerns the manufacturing of chip cards, particularly cards capable of operating without contact by means of an antenna integrated into the card. Under this name "contactless cards", there are envisaged on the one hand cards which can communicate with the outside only through the antenna, and also and in particular mixed cards which can communicate with the outside either by means of the antenna or by means of standardised conventional contacts.

Such cards are intended to perform various operations such as, for example, banking operations, telephone communications, identification operations, operations of debiting or reloading units of account, all kinds of operations which can be performed either by inserting the card into a reader or remotely by electromagnetic coupling (in principle of the inductive type) between a sending/receiving terminal and a card placed in the zone of action of this terminal.

2. Related Background

Contactless cards must preferably have standardised dimensions identical to those of conventional smart cards provided with contacts. This is obviously particularly essential for mixed cards, and is desirable for cards operating solely without contacts.

The usual standard ISO 7810 defines a card 85 mm long, 54 mm wide and 0.76 mm thick. The contacts are flush at clearly defined positions on the surface of the card.

These standards impose severe constraints in manufacture. The very small thickness of the card is in particular a major constraint, more severe still for contactless cards than for cards simply provided with contacts, since it is necessary to provide for the incorporation of an antenna in the card.

The technical problems which are posed are problems of positioning the antenna with respect to the card, since the antenna occupies almost an entire surface of the card, problems of positioning the integrated-circuit module (comprising the chip and its contacts, which provides the electronic functioning of the card), and problems of precision and reliability of the connection between the module and the antenna; finally, constraints of mechanical strength, reliability and manufacturing cost must be taken into account.

The aim of the invention is to propose a manufacturing method which best resolves the different constraints of sizing, manufacturing precision, mechanical strength, and more generally reliability, cost and efficiency in manufacturing the card.

SUMMARY

For this purpose, according to the invention, a method of manufacturing a chip card with contactless transmission is proposed, principally characterised in that an integrated-circuit module and an antenna made from flat-wound wire is produced, the antenna ends are fixed to connection areas of the module, the antenna/module assembly is temporarily fixed against a plate made of plastics material having an opening which can serve as a housing for the module, another plate of plastics material is placed on the antenna/module assembly, and the two plates are connected, enclosing the antenna and module.

The temporary fixing of the antenna/module assembly is preferably effected by bonding an adhesive sheet to the first plate and the module is applied against the adhesive face of this sheet inside the opening which serves as a housing for the module. The adhesive sheet is subsequently detached. If the card is a mixed card, the access contacts are bared when the sheet is removed, since they are flush with the bottom of the opening serving as a housing for the module.

This method is simple and inexpensive and reliably and precisely resolves the problem of contact between the chip module and the antenna: the electrical connection is made before fitting the assembly in a plastic card. The module is correctly placed in the card, and the antenna also.

The plastic film provided with metallic parts, on which the integrated circuit is placed in order to constitute the module, can in practice be in particular of two kinds: double-face printed-circuit film or metallic grille covered with an insulated plastic film, but in practice the solution with a double-face printed-circuit film is clearly preferably since it makes it possible to fix the antenna ends exactly flat on the connection areas, whilst the other solution would make it necessary to fix the antenna ends in insulating-film openings, the thickness of the insulating film around these openings impeding the fixing.

In the case of a module produced from a double-face printed circuit, the chip is fixed on one side (the front face of the film) and connected by soldered wires to metallic connection areas situated on this side. The antenna is also welded to connection areas on this side. The rear face has metallic parts cropped to the format of the standardised contacts of a smart card (for a mixed card), conductive vias being provided between the metallic parts of the front face and those of the rear face in order to establish the necessary electrical connections between the external contacts of the rear face and the inputs/outputs of the chip.

Conventionally, the chip is immersed in a protective resin before the module is inserted in the card.

The two plates of plastics material of the card can be connected by hot or cold lamination, a resin being able to be interposed between the two plates, in order to serve as a binder between them and as a sealing product in order to isolate the module and antenna from the outside.

In practice, the manufacturing method includes the following steps:
  there is produced an integrated-circuit module which can be inserted in a card, comprising an integrated-circuit chip mounted on a plastic film provided with metallic parts, the metallic parts comprising on the one hand connection areas allowing a connection with the chip and on the other hand two connection areas for connection with an antenna, these two latter areas being at a given distance from each other and also being connected electrically to connection areas permitting connection with the chip;
  a flat-wound antenna wire is produced, having two ends situated substantially at the same predetermined distance from each other;
  the antenna ends are fixed to the two corresponding connection areas;
  the antenna/module assembly is bonded against a plate made of plastics material having an opening which can serve as a housing for the module, so that the antenna/module assembly is held in place against the plate during the subsequent operations;

another plate made of plastics material is placed on the antenna/module assembly;

the two plates are connected, enclosing the antenna and module.

BRIEF DESCRIPTION OF THE FIGURES

Other characteristics and advantages of the invention will emerge from a reading of the following detailed description which is given with reference to the accompanying drawings, in which.

DETAILED DESCRIPTION

Figure 1:
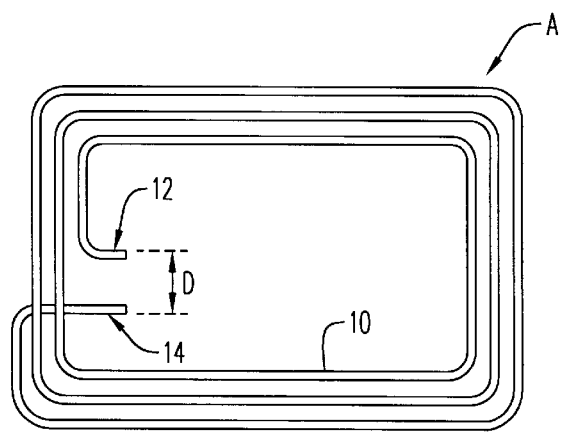
FIG. 1 depicts an antenna made from a wound wire produced in a format which can be incorporated in a smart card.

The antenna A depicted in FIG. 1 is a simple wire 10 wound flat, the stiffness inherent in the wire being sufficient for the antenna to be able to be manipulated during the operations of insertion in the card, keeping its overall flat shape. This antenna represents an inductance allowing communication at a distance by electromagnetic coupling of the inductive type.

The wire can be covered with an insulant preventing contact between adjacent turns. In any event an insulant is provided if the turns intersect (the case where there are several turns). However, the ends of the wire are bared with a view to their electrical connection to an integrated-circuit module.

The dimensions of the antenna are, for reasons of electromagnetic efficiency, very close to the outside dimensions of the chip card, and it is also one of the reasons why the positioning of the antenna in the card must be carried out precisely.

The ends 12 and 14 of the antenna are at a predetermined distance D from each other, and are preferably turned towards the inside of the turns, so that the electronic module can be placed on the inside of the turns, the perimeter of the antenna then coming as close as possible to the perimeter of the smart card in which it is to be embedded.

Figure 2:
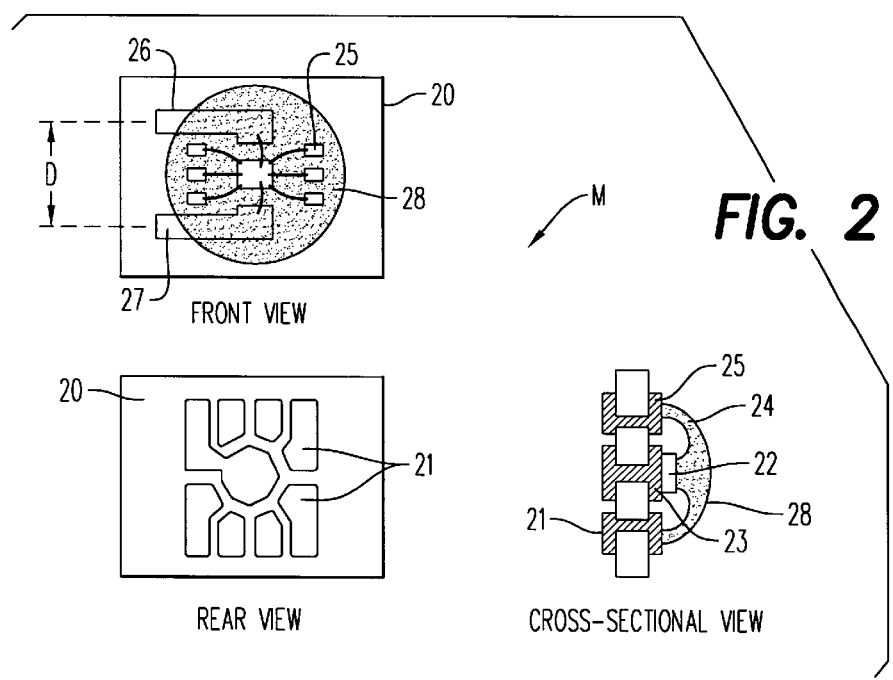
FIG. 2 depicts a module in front view, rear view and a view in section, in an embodiment on a doubleface metallised film.

The module M of FIG. 2 comprises an insulating film 20, a front-face metallisation, a rear-face metallisation, and conductive vias connecting the front-face metallisations to the rear-face metallisations. The relative scale of the dimensions, particularly in thickness, is not complied with, in order for the figures to be be legible.

The metallisation of the rear face is cut out into contacts 21 in a standardised format for smart cards; these contacts will be flush on the smart card at the end of manufacture.

A chip 22 is soldered to a central area 23 of the front-face metallisation; soldered wires 24 connect the chip to connection areas 25 of the front-face metallisation (other connection methods can be envisaged, for example a direct connection in the case of turned-over chips in "flip-chip" mode).

Two connection areas 26 and 27 are reserved for fixing the ends of the antenna A. These areas are electrically connected to connection areas 25 serving to receive wires of a chip. In practice, the areas 26 and 27 constitute extensions of two connection areas 25, these extensions being sufficiently separated from the central area to which the chip is fixed: the chip 22 is covered with a drop of protective resin 28, but the connection areas 26 and 27 are sufficiently distant from the central area for the resin not to cover them.

The connection areas 26 and 27 are situated on the film 20 at a distance from each other corresponding substantially to the distance D between the ends of the antenna wire A, so that these ends can be soldered easily to the areas 26 and 27.

Figure 3:
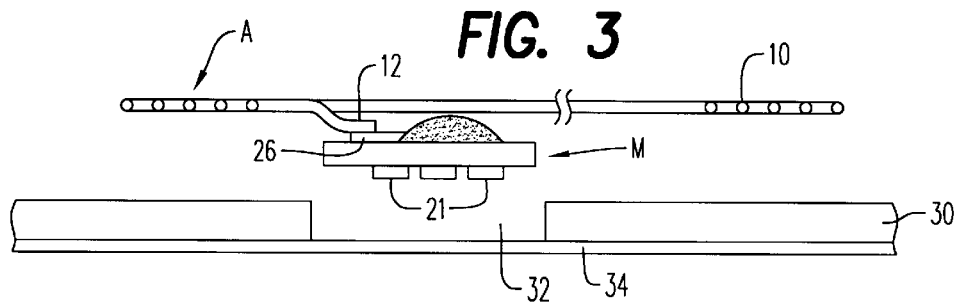
FIG. 3 depicts the assembled antenna/module assembly.

FIG. 3 depicts, in lateral section, the antenna/module assembly, after the operation of soldering the antenna ends to the areas 26 and 27; it also depicts a plate made of plastics material 30 (which can already be in the format of a smart card or which will be subsequently cut to this format). The plastics material can be polyvinyl chloride (PVC) or another plastics material.

This plate constitutes a part of the body of the smart card. It has an opening 32 which can serve as a housing for the module M, this opening passing through the entire thickness of the plate. The dimensions of the openings are at least equal to those of the module M. If possible these dimensions are accurately adjusted with respect to the dimensions of the modules. The position of the openings with respect to the format of the plate corresponds to the standardised position of the contacts of a smart card.

The rear face of the plate is covered with an adhesive sheet 34, the adhesive face of which is applied against the plate. This sheet covers the opening 32 so that it constitutes a base for the housing formed in the card by the opening 32. This base is adhesive.

Figure 4:
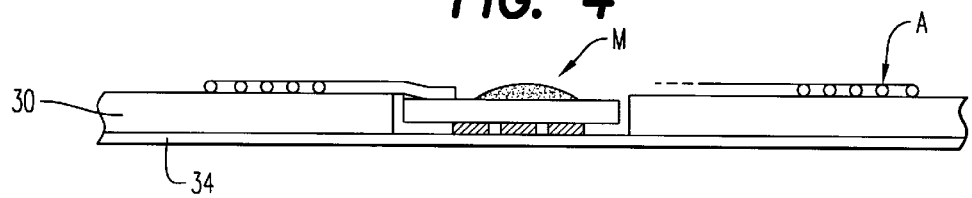
FIG. 4 depicts the fitting of the antenna/module assembly against a plastic plate in the format of the card, provided with an adhesive sheet.

FIG. 4 depicts the fitting of the antenna/module assembly against the plate 30, the module being inserted in the opening 32 and being bonded by the adhesive material against the sheet 34.

The housing and the adhesive material keep the antenna/module assembly in precise position during the subsequent operations, which introduce mechanical stresses. The assembly can be coated at this stage with a thick resin which improves the holding in place and which will serve as a binder and sealing substance protecting the antenna and module.

Figure 5:
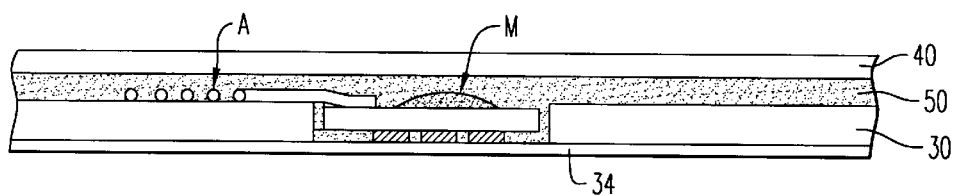
FIG. 5 depicts the fitting of another plastic plate in order to cover the module assembly.

Another plate 40 made of plastics material cut to the format of the smart card (except if the format is defined subsequently) is applied against the top face of the assembly thus produced, that is to say on the same side as the antenna rather than the adhesive sheet (FIG. 5). The plastics material can be polyvinyl chloride (PVC) or other.

A cold or hot lamination operation is performed in order to connect the plates whilst enclosing the antenna/module assembly. For cold lamination, the insertion of a bonding resin (which can be the resin mentioned above) is necessary.

FIG. 5 depicts the chip card at this stage, with the plate 30 and 40 an each side of the antenna/module assembly, and the binding resin 50 immersing the assembly between the plates.

Figure 6:
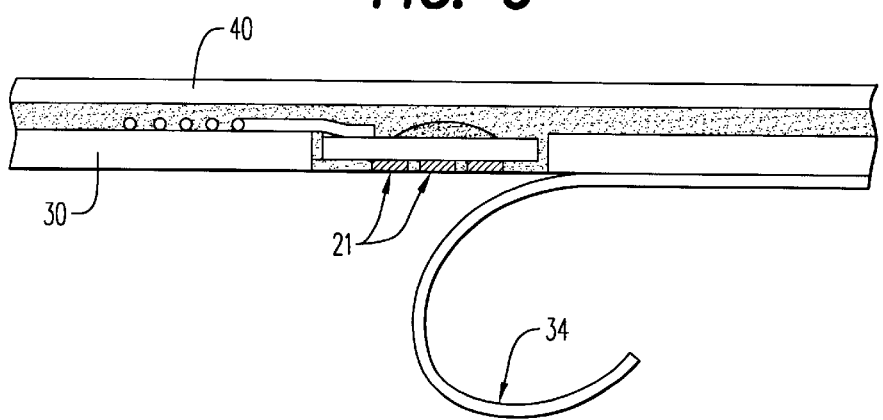
FIG. 6 depicts the finished card, at the stage of removal of the adhesive sheet and ready to be used.

The last operation (FIG. 6) consists of removing the adhesive sheet 34, then revealing the bared contacts 21 of the smart card.

The method which has just been described would also be applicable in the case of a module produced not from a double-face metallised film but from a grille cut out to the shapes of necessary contacts and covered with an insulating film cut so as to bare a chip fixing area, connections areas for the chip wires, and connection areas for the antenna wire. It would however be less easy to solder the antenna wire in the latter areas because of the thickness of the insulating film.

What is claimed is:

1. A method of manufacturing a smart card capable of operating in a contactless mode, comprising:

forming an antenna/module assembly by affixing ends of an antenna to connection areas of a module, wherein the antenna is formed from a flat wound wire;

securely positioning the antenna/module assembly against a first plastic plate, the first plastic plate having an opening which serves as a housing for the module;

placing a second plastic plate on the antenna/module assembly; and connecting the second plastic plate to the first plastic plate, thereby enclosing the antenna/module assembly.

2. The method of claim 1, wherein the first plastic plate also includes an adhesive sheet affixed to the side of the first plastic sheet opposite the side the antenna/module assembly is positioned against.

3. The method of claim 1, wherein the step of connecting the second plate to the first plate comprises connecting the second plastic plate to the first plastic plate through a cold bonding process and inserting a bonding resin between the second plastic plate and the first plastic plate.

4. The method of claim 1, wherein the second plastic plate is connected to the first plastic plate through a hot bonding process.

5. The method of claim 2, wherein the antenna/module also includes access contacts, and wherein removal of the adhesive sheet reveals the access contacts as flush with an outside surface of the first plastic plate.

6. A method of manufacturing a smart card capable of operating in a contactless mode, comprising:

forming an antenna/module assembly by affixing ends of an antenna to connection areas of a module, wherein the antenna is formed from a flat wound wire;

securely positioning the antenna/module assembly against a first plastic plate, the first plastic plate having an opening which serves as a housing for the module and having an adhesive sheet affixed to an outside surface;

placing a second plastic plate on the antenna/module assembly;

connecting the second plastic plate to the first plastic plate, thereby enclosing the antenna/module assembly; and removing the adhesive sheet to expose access contacts of the module.

7. The method of claim 6, wherein the access contacts are flush with an outside surface of the smart card formed by an outside surface of the first plastic plate.

8. A method of manufacturing a mixed smart card capable of operating both in a contactless mode and in a contact mode, comprising:

forming an antenna from a flat wound wire;

forming a module which includes standardized access contacts;

affixing ends of the antenna to connection areas of the module, so as to obtain an antenna/module assembly;

affixing the antenna/module assembly against a first plastic plate, the first plastic plate having an opening which serves as a housing for the module;

placing a second plastic plate on the antenna/module assembly; and connecting the second plastic plate to the first plastic plate, thereby enclosing the antenna and the module;

wherein the affixing of the antenna/module assembly includes temporarily securely positioning an adhesive sheet to the first plastic plate, and securely positioning the module against an adhesive side of the adhesive sheet inside the opening for the module so the standardized access contacts are flush with an outside surface of the mixed smart card.

9. The method of claim 8, wherein the adhesive sheet is removed after the connecting the second plastic plate to the first plastic plate, revealing the standardized access contacts flush with the outside surface of the mixed smart card.

10. The method of claim 8, wherein the second plastic plate is connected to the first plastic plate through a cold bonding process, and wherein a bonding resin is inserted between the second plastic plate and the first plastic plate.

11. The method of claim 8, wherein the second plastic plate is connected to the first plastic plate through a hot bonding process.

12. A smart card comprising:

a module with standardized access contacts and an antenna attached to the module, the antenna being formed from a flat wound wire, and ends of the antenna being affixed to connection areas of the module, so as to form an antenna/module assembly;

a first plastic plate having an opening which serves as a housing for the module;

an adhesive sheet securely positioned against the first plastic plate with the module inserted in the opening of the first plastic plate so the standardized access contacts are flush with a bottom of this opening in such a way that removing the adhesive sheet reveals bared standardized access contacts flush with an outside surface of the mixed smart card;

a second plastic plate connected to the first plastic plate to enclose the antenna and the module.

13. A mixed smart card comprising:

a module having access contacts;

an antenna formed of a flat wound wire attached to the module;

a first plastic plate formed with an opening, the opening serving as a housing for the module, a second plastic plate, wherein the second plastic plate and the first plastic plate enclose the antenna and the module;

the access contacts being flush with an outside surface of the first plastic plate that forms an outside surface of the mixed smart card;

and an adhesive sheet temporarily securely affixed to the outside surface of the first plastic sheet, so that removal of the adhesive sheet exposes the access contacts flush with the outside surface of the first plastic plate.

* * * * *